(12) United States Patent
Gentles

(10) Patent No.: US 7,600,108 B2
(45) Date of Patent: Oct. 6, 2009

(54) GAMING MACHINE HAVING REDUCED-READ SOFTWARE AUTHENTICATION

(75) Inventor: Thomas A. Gentles, Algonquin, IL (US)

(73) Assignee: WMS Gaming Inc., Waukegan, IL (US)

( * ) Notice: Subject to any disclaimer, the term of this patent is extended or adjusted under 35 U.S.C. 154(b) by 905 days.

(21) Appl. No.: 10/463,173

(22) Filed: Jun. 17, 2003

(65) Prior Publication Data

US 2004/0259643 A1    Dec. 23, 2004

(51) Int. Cl.
*H04L 9/00* (2006.01)
(52) U.S. Cl. .................................. 713/2; 726/4; 726/21
(58) Field of Classification Search ......... 711/100–104, 711/111–112, 216; 726/2, 4, 17, 21, 26, 726/34; 713/1–2, 100, 165; 709/225, 229; 380/229, 232, 241, 251
See application file for complete search history.

(56) References Cited

U.S. PATENT DOCUMENTS

| | | | | |
|---|---|---|---|---|
| 4,405,829 A | 9/1983 | Rivest et al. | ................ | 178/22.1 |
| 4,727,544 A | 2/1988 | Brunner et al. | ................ | 371/21 |
| 5,231,668 A | 7/1993 | Kravitz | .................... | 380/28 |
| 5,643,086 A | 7/1997 | Alcorn et al. | ................. | 463/29 |
| 5,644,704 A | 7/1997 | Pease et al. | ............ | 395/183.18 |
| 5,692,178 A * | 11/1997 | Shaughnessy | .................. | 707/8 |
| 5,892,904 A * | 4/1999 | Atkinson et al. | ............... | 726/22 |
| 6,071,190 A | 6/2000 | Weiss et al. | .................... | 463/25 |
| 6,099,408 A | 8/2000 | Schneier et al. | ............... | 463/29 |
| 6,106,396 A | 8/2000 | Alcorn et al. | ................. | 463/29 |
| 6,149,522 A | 11/2000 | Alcorn et al. | ................. | 463/29 |
| 6,190,257 B1 * | 2/2001 | Takeda et al. | ................. | 463/29 |
| 6,203,427 B1 | 3/2001 | Walker et al. | ................. | 463/16 |
| 6,264,557 B1 | 7/2001 | Schneier et al. | ............... | 463/29 |
| 6,336,585 B1 * | 1/2002 | Harada | ........................ | 235/380 |
| 6,450,885 B2 | 9/2002 | Schneier et al. | ............... | 463/29 |
| 6,527,638 B1 | 3/2003 | Walker et al. | ................. | 463/25 |
| 6,565,443 B1 | 5/2003 | Johnson et al. | ............... | 463/43 |
| 6,595,856 B1 | 7/2003 | Ginsburg et al. | .............. | 463/29 |
| 6,620,047 B1 | 9/2003 | Alcorn et al. | ................. | 463/37 |

(Continued)

FOREIGN PATENT DOCUMENTS

GB        2121569 A    12/1983

(Continued)

OTHER PUBLICATIONS

Digital Signature Standard (DSS), FIPS Pub 186-2, U.S. Department of Commerce/National Institute of Standards and Technology, 72 pages (Jan. 27, 2000).

(Continued)

*Primary Examiner*—Kimyen Vu
*Assistant Examiner*—Leynna T Truvan
(74) *Attorney, Agent, or Firm*—Nixon Peabody LLP

(57) ABSTRACT

A gaming machine that authenticates the gaming software at boot-up or after a reset. A processor in conjunction with the boot memory reads the bits of data and files from a non-volatile memory device via a single read of each bit. The files are each validated while the bits of non-volatile memory data are simultaneously validated. After all the files and the data are validated then the gaming software is authenticated.

39 Claims, 4 Drawing Sheets

U.S. PATENT DOCUMENTS

| | | | |
|---|---|---|---|
| 6,685,567 B2 | 2/2004 | Cockerille et al. | 463/43 |
| 6,722,986 B1 | 4/2004 | Lyons et al. | 463/29 |
| 6,889,209 B1* | 5/2005 | Rabin et al. | 705/57 |
| 7,080,257 B1* | 7/2006 | Jakubowski et al. | 713/187 |
| 7,108,605 B2* | 9/2006 | LeMay et al. | 463/43 |
| 7,158,637 B2* | 1/2007 | Ohta et al. | 380/37 |
| 7,179,170 B2* | 2/2007 | Martinek et al. | 463/29 |
| 7,225,333 B2* | 5/2007 | Peinado et al. | 713/164 |
| 7,228,426 B2* | 6/2007 | Sinha et al. | 713/176 |
| 7,356,188 B2* | 4/2008 | Venkatesan et al. | 382/229 |
| 7,401,352 B2* | 7/2008 | Duri et al. | 726/1 |
| 2004/0002381 A1 | 1/2004 | Alcorn et al. | 463/37 |
| 2004/0038740 A1 | 2/2004 | Muir | 463/40 |

FOREIGN PATENT DOCUMENTS

| | | |
|---|---|---|
| JP | 8-141196 | 6/1996 |
| JP | 10-192533 | 7/1998 |
| WO | WO 97/08870 A2 | 3/1997 |
| WO | WO 97/08870 A3 | 3/1997 |
| WO | WO99/65579 | 12/1999 |
| WO | WO 99/66413 A1 | 12/1999 |
| WO | WO00/33196 | 6/2000 |
| WO | WO 01/24012 A1 | 4/2001 |
| WO | WO 01/67218 A1 | 9/2001 |
| WO | WO 02/15998 A2 | 2/2002 |
| WO | WO 02/15998 A3 | 2/2002 |
| WO | WO 02/101537 A1 | 12/2002 |
| WO | WO 03/045519 A1 | 6/2003 |

OTHER PUBLICATIONS

Schneier B: "Applied Cryptography Protocols, Algorithms, and Source Code in C"; Jan. 1, 1996, John Wiley & Sons, New York, US, XP002298839 ISBN: 0-471-12845-7—p. 431.

"JFFS—Journaling Flash File System" Jan. 15, 2003, XP002298844; URL:http://web.archive.org/web/20030115142 058/http://developer.axis.com/software/jffs/doc/jffs.shtml—retrieved on Oct. 1, 2004—p. 1-p. 6.

* cited by examiner

GAMING MACHINE HAVING REDUCED-READ SOFTWARE AUTHENTICATION

REFERENCE TO RELATED APPLICATIONS

This application is related to U.S. patent application Ser. No. 10/119,663 filed Apr. 10, 2002, entitled "Gaming Software Authentication," and incorporated herein by reference in its entirety.

FIELD OF THE INVENTION

The present invention relates generally to gaming machines, and more particularly, to software authentication in a gaming machine.

BACKGROUND OF THE INVENTION

As a regulatory requirement in virtually all jurisdictions that allow gaming, it is necessary to have a technique to authenticate that the software installed in a gaming machine is tested and approved. In the past, gaming manufacturers have generally used EPROM-based hardware platforms to store program code. As a result, a number of software authentication techniques have been accepted as standards throughout the gaming industry. Depending upon the preferences of the local regulatory agency, these techniques generally include either a Kobetron signature or a hash function based on the data stored in the EPROM device.

Authentication of software programs basically occurs using two different methods in the field, again determined by the local regulatory agency. In one method, each EPROM is authenticated by a gaming agent prior to being installed in a gaming machine that is to be brought up for play. The EPROMs may be shipped directly to the gaming agency for authentication prior to the install date of the machine, or may be authenticated on the casino floor as the software is being installed in the machine. In another method, authentication is conducted on a spot-check basis. A gaming agent periodically visits a casino and picks machines selectively or at random to remove the software components for authentication.

Jurisdictional requirements require that storage media containing code or data be authenticated at power-up, continuously or at a periodic rate, or upon occurrence of predetermined events, such as the opening any doors or panels of the gaming device that allows access to internal circuitry. The storage media may be comprised of erasable programmable read-only memory devices (EPROMs), electrically erasable programmable read-only memory devices (EEPROMs), PROMs, CompactFlash storage cards, hard disk drives, CD drives, or substantially any non-volatile memory and in some cases volatile memory (e.g., NVRAM, specialty mask semiconductors, battery backed RAM, SRAM, DRAM, etc.). The storage media comprises a memory device and the data stored thereon. Authentication of storage media is controlled by the gaming device's central processing unit (CPU). However, authentication by the CPU may take more than several minutes due to increasing complexity of the gaming device's software and thus the storage size of the media.

For example, in some gaming machines, the authentication and boot process may require up to or more than three (3) complete (or close to complete) read cycles of the storage media. The three read cycles are required to complete software authentication of the gaming program as a whole (the bits of data), the gaming program files individually, and to load the software in an executable memory. Consider a game machine that takes advantage of and uses a media device that is potentially alterable or rewritable throughout execution of the program. Such an alterable media device could be, for example, a CompactFlash storage card, EEPROM, ROM, hard drive, CD ROM, DRAM, SRAM, or other non-volatile memory device (or volatile memory device) that can store an executable software program, or parts thereof, required for the gaming operation. Referring to FIG. 2, a typical software authentication algorithm would involve first reading all the bits of information from the alterable media device in order to validate the entire software media image 20. If the software media image (all the bits of information in the storage media) is successfully validated 22, then the executable software program stored in the alterable media device is read in order to validate each file of the gaming software program at the file level 24. If time file level authentication is successful 26, the gaming software program is read a third time in order to load the gaming software program into an executable memory device 28 such as a DRAM or any other applicable volatile or non-volatile memory. Thus, in order to authenticate and load the gaming program, the gaming program is read, for example, three times. If the time it takes to read the gaming program is T, then, at a minimum, the time required to authenticate the gaming program and load the appropriate executable memory devices or storage media of a gaming machine is 3T. In practicality, regulators and gaming operators have expressed a desire to see the time required to authenticate the gaming program in certain commercial products with large storage media components reduced. Thus, there is a need for a system and/or method for speeding up the authentication process.

SUMMARY OF THE INVENTION

In an embodiment of the present invention a gaming machine includes a CPU. The processor in the CPU requires substantially only a single read of a storage device in order to authenticate the bits of data in the device, to authenticate the files in the device and to move, if necessary, the files in the device to an executable memory device thereby decreasing the amount of time required to authenticate the gaming machine's software at boot-up and after a reset.

An embodiment of the present invention comprises a gaming machine that authenticates the gaming software at boot-up or after a reset. A processor in conjunction with the boot memory reads the bits of data and the files from a non-volatile memory device via a single read of each bit. The files are each validated while at substantially the same time the bits of non-volatile memory data are simultaneously validated. After all the files and the data are validated then the gaming software is authenticated.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
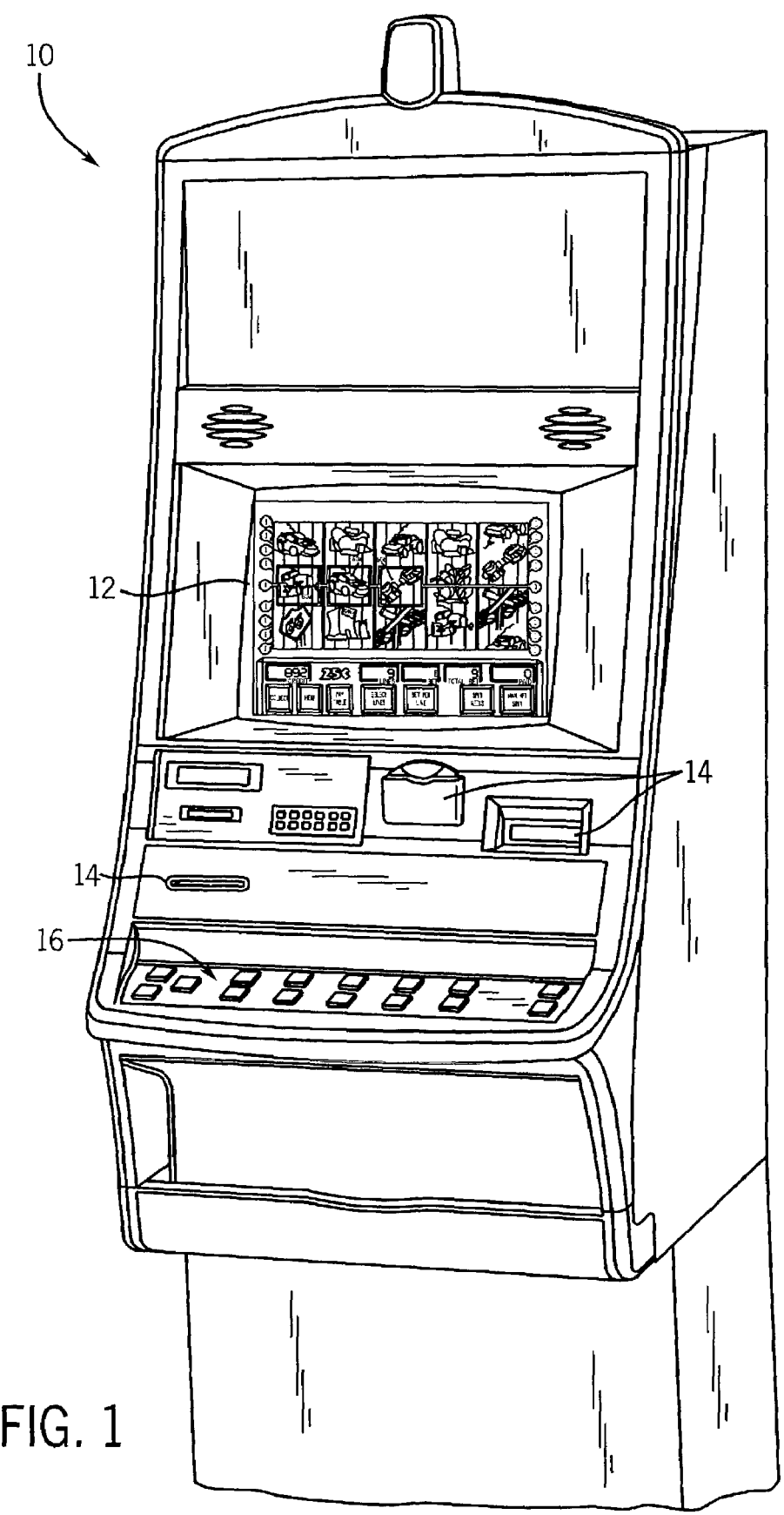
FIG. 1 is an isometric view of a gaming machine operable to conduct a wagering game.
Figure 2:
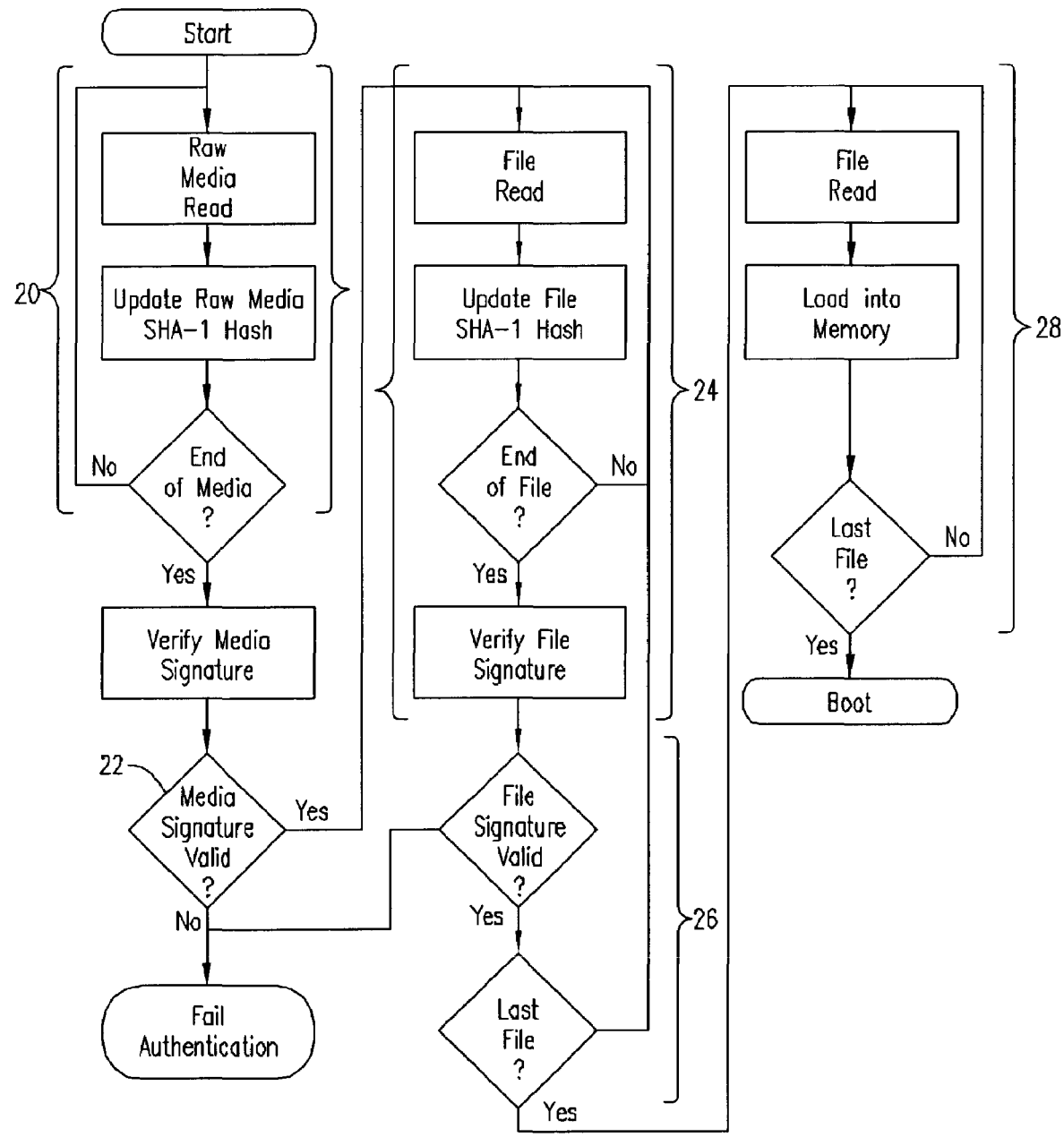
FIG. 2 is an exemplary flow chart depicting an authentication and boot process for a gaming machine.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a gaming machine 10 is operable to conduct a wagering game such as mechanical or video slots, poker, keno, bingo, or blackjack. If based in video, the gaming machine 10 includes a video display 12 such as a cathode ray tube (CRT), liquid crystal display (LCD), plasma, or other type of visual display known in the art. A touch screen preferably overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player.

The gaming machine 10 includes a plurality of possible credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

The gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a "help" button for viewing a help screen, a "pay table" button for viewing the pay table (s), and a "call attendant" button for calling an attendant. Additional game-specific buttons may be provided to facilitate play of the specific game executed on the machine. The touch screen may define touch keys for implementing many of the same functions as the push-buttons. Other possible user interface devices include a keyboard and a pointing device such as a mouse or trackball.

Figure 3:
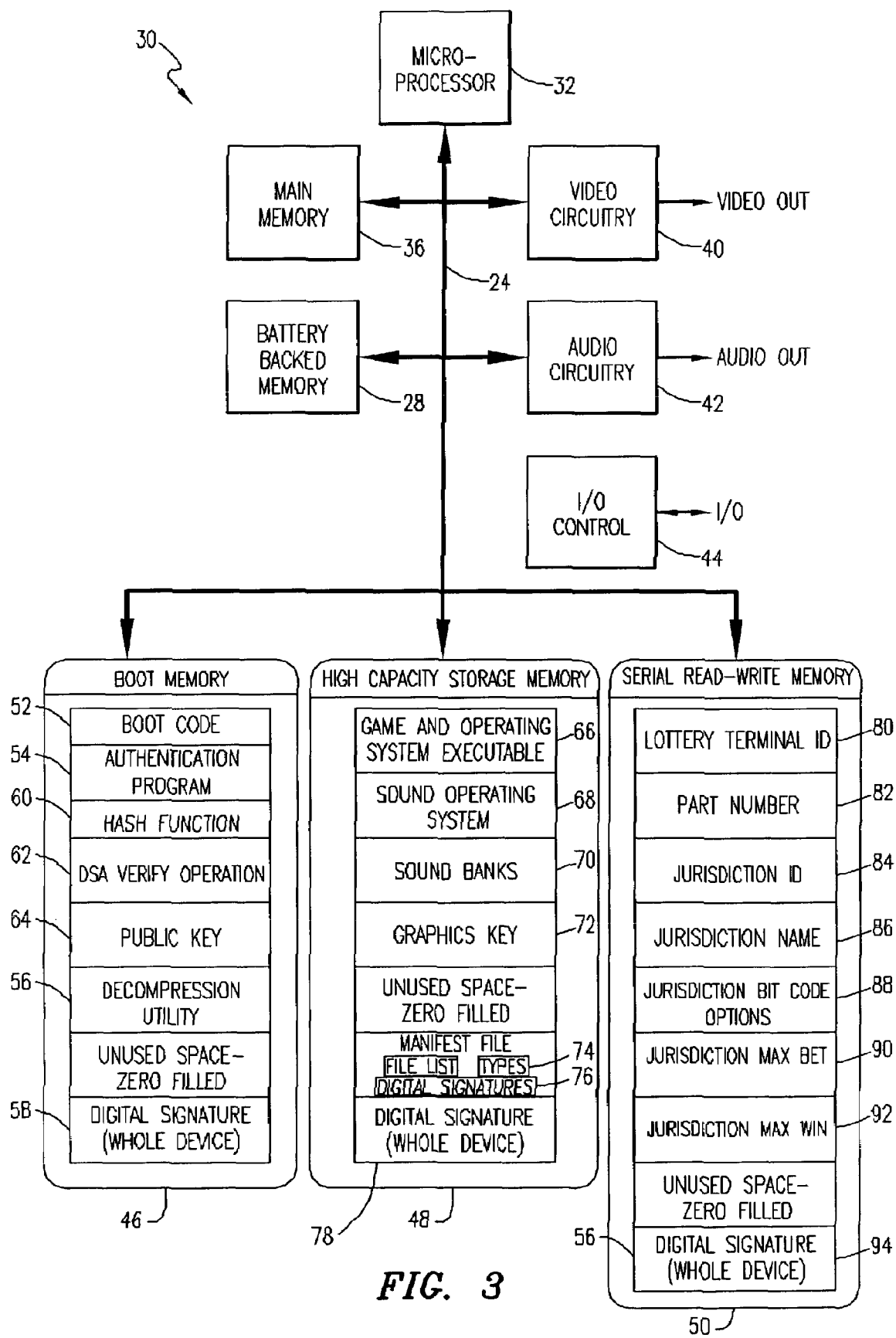
FIG. 3 is an exemplary block diagram of a CPU in a gaming machine according to the present invention.

Referring now to FIG. 3, a central processing unit (CPU) 30 controls operation of the gaming machine 10. In response to receiving a wager and a command to initiate play, the CPU 30 randomly selects a game outcome from a plurality of possible outcomes and causes the display 12, via the video circuitry 39 and video out 40, to depict indicia representative of the selected game outcome. Alternatively, the game outcome may be centrally determined at a remote computer using either a random number generator (RNG) or pooling schema. In the case of slots, for example, mechanical or simulated slot reels are rotated and stopped to place symbols on the reels in visual association with one or more pay lines. If the selected outcome is one of the winning outcomes defined by a pay table, the CPU 30 awards the player with a number of credits associated with the winning outcome.

The CPU 30 includes a microprocessor 32 and various memory devices (media devices). The microprocessor 32 interfaces with many other components of the gaming machine 10 via an interface bus 34. A main memory 36 stores the executable gaming machine software program variables and files for operating the gaming machine 10. The main memory may be DRAM or SRAM or substantially any other volatile memory device or reprogrammable non-volatile memory device. The battery backed memory 38 stores machine critical data that cannot be lost when power is removed from machine 10. The battery backed memory 38 may be battery backed volatile memory or a reprogrammable non-volatile memory device. The video circuitry 40 supplies display information to a video display 12 which may comprise a CRT, LCD, plasma, or other display device. Audio circuitry 42 generates sounds for game play on the gaming machine 10. The I/O control 44 controls input/output interfaces with the user interfaces such as game buttons 16, coin validators 14, touch screen bill validators, etc.

In an exemplary embodiment, the various memory devices may also include a boot memory 46, a high capacity storage memory 48, and a serial read-write memory 50. The boot memory 46 is preferably a read-only memory such as a one megabit EPROM, EEPROM, PROM or other type of programmable read-only memory. The boot memory may also be substantially any type of non-volatile memory. The high capacity storage memory 48 is preferably a CompactFlash card, but may also be a hard disk drive, CD drive, or other type of non-volatile memory. The serial memory 50 is preferably an EEPROM such as a 512 byte SPI EEPROM, but could be any type of programmable read-only or read/write non-volatile memory. Depending upon the preferences of the local gaming regulatory agency, all three memories may be adapted to be authenticated outside of the CPU as well as when installed in the CPU at power up or prior to being utilized in the gaming machine.

The boot memory 46 stores, at least, boot code 52, an authentication program 54, a RAM loader, a decompression utility 56, and a digital signature 58. The authentication program includes a hash function 60, a digital signature verify operation 62, and a public key 64. The hash function 60 may, for example, be an SHA-1 hash algorithm that reduces a data set to a unique 160 bit message digest. A hash algorithm or function is used to calculate an index or message digest corresponding to the files in, for example, a memory device. The message digest does not have to be unique, i.e., the function may return the same hash value for two or more items. The non-uniqueness of the hash value for each item in the message digest is acceptable because each hash value is positioned in different locations in the index. The message digest is a small representation of a large amount of data. A message digest is a relatively unique representation of data, from a cryptographic standpoint, and is an irreversible representation of the data. In other words, one cannot recreate the original data from the message digest.

The digital signature 58 is generated, in effect, from the boot memory's contents as a whole. In an exemplary embodiment, after hashing is performed to produce a message digest, then a digital signature is created to enable the origin and authenticity of the digest to be determined. When there is data that requires a means for determining the origin of the data, one generally uses a digital signature mechanism. There exists a federal standard called FIPS 186-2 that defines a digital signature generation and verification mechanism called the Digital Signature Algorithm (DSA). In an exemplary embodiment a digital signature is created from the message digest. In essence the DSA uses a private key, a public key, and the message digest. A private key and the message digest is used to create an original signature associated with the original message digest. The public key, the original signature, and the message digest are used to check a signature associated with a message digest in order to determine the origin and authenticity of the digest. It is understood that neither the message digest nor the data or files used to create the message digest can be recreated using the DSA. The digital signature 58 is used to sign the message digest containing the hash(es) of the boot memory contents. Again, the signature may be used to determine the source or manufacturer of the hash or message digest, via a public key, but cannot be used to recreate the hash or the original data. Furthermore, the DSA is not being used here as an encryption process, but rather a technique for validating the signature associated with the hash, and the public key.

The high capacity storage memory 48 stores game and operating system executable program files 66, sound operating system files 68, sound bank files 70, graphics files 72, a manifest file 74, and digital signatures 76, 78. The files in the high capacity storage memory 48, taken together, constitute a "gaming program" as that term is used herein, and the various files constitute "data files" as that term is used herein. Thus, the gaming program includes a plurality of data files. For each data file on the high capacity storage memory 48, the manifest file contains a file name, a file type, a load address, and a file digital signature 76. The whole device digital signature 78 is generated from the gaming program as a whole, while each digital signature 76 is generated from the associated data file listed in the manifest file.

The serial read-write memory 50 stores information/data specific to the jurisdiction where the CPU is to be installed. This information may, for example, include a lottery terminal identification (ID) 80, a part number 82, a jurisdiction ID 84, a jurisdiction name 86, jurisdiction bit code options 88, jurisdiction max bet 90, jurisdiction max win 92, and a digital signature 94. The digital signature 94 is generated from the serial memory's contents as a whole.

The boot memory 46, serial read-write memory 50 and high capacity storage memory 48 may each be removable devices and/or contain alterable software that may be able to be reprogrammed or to download updates from an outside source via a programming device, a network such as the Internet, an intranet, an Ethernet, a fibre loop, or other type of networking system. The boot memory, 46, serial read-write memory 50, and high capacity memory 48 each may be required to be authenticated by the gaming machine 10 at various points during operation of the gaming machine.

In accordance with an embodiment of the present invention, during boot-up of the gaming machine, the CPU 30 is powered up. The microprocessor 32 within the CPU 30 addresses the boot memory 46 and utilizes the boot code 52 to begin operations. The authentication program 54, within the boot memory 46, is initialized so that a predetermined amount of the gaming software stored in a non-volatile memory device (media device) can be authenticated and correctly loaded into or initialized in an executable memory such as the main storage memory 36. In essence, one or more of the software components (the contents of the boot memory 46, the high capacity storage memory 48 or serial read-write memory 50) may be properly authenticated prior to use of the gaming machine. It should be noted that the items in the high capacity storage memory 48 are only representative of the vast variety of files that could be stored as part of an executable program or gaming program in a gaming machine. In some exemplary embodiments only the flash memory or high capacity storage memory 48 is required to be authenticated at boot-up.

Elements, whether a software element or firmware elements that are required to be authenticated at boot-up, are denoted in the boot memory 46. Denotation in the boot memory 46 is done because the boot memory 46 may be externally authenticated to the satisfaction of a regulatory agency. Thus, at boot-up the boot memory may have already been authenticated by an external device.

In order to better understand the advantages of the exemplary reduced read algorithm, it is important to realize that as gaming machines evolved they began to use alterable media, such as flash memories, EEPROMs, EPROMs, CD drives, disk drives, etc. in their electronics and programming structure to store all or portions of the executable programs and files. Newer gaming machines are designed to allow the gaming software to be updated, to grow in size, and to grow in complexity. Because of these advances and changes in gaming machine design, electronics, software and memory storage size the time necessary to authenticate the software in the storage media at boot-up increased because the methods required to authenticate the software content became more complex. An increase in the time required to authenticate the software during boot-up of each gaming machine impacts customer operations by lengthening the set up time or down time of a gaming machine due to the system reboot time.

Exemplary embodiments of the present system and methods for reduced read software authentication effectively reduce the amount of time required to authenticate the raw data and/or the gaming program software contents of the non-volatile memory devices containing executable programs and/or data. In a nutshell, the exemplary algorithm or technique reads a reprogrammable, non-volatile storage media (e.g., high capacity storage memory 48 and/or serial read-write memory 50) at boot-up and then maps the executable software into the appropriate volatile memory. The reading and mapping is performed by the processor emulating what an operating system's file system does when reading files from non-volatile memory and mapping the files into executable volatile memory. Authenticating the gaming program (the bits) and individual data files, using one read of a storage media device, allows the file level authentication to be performed in parallel (in a multiplexed fashion, or at substantially the same time) with a total raw media verification of the high capacity storage memory 48, eliminating a need for additional reads of the non-volatile memory 48 thereby saving time. In addition, once the data bytes are read from the non-volatile memory, they are mapped into the appropriate file and the boot loading software can load the file data into the main memory 30, thus avoiding an additional media read/write cycle for loading the gaming program software into executable non-volatile memory. The number of media reads is limited to about one total read thereby decreasing the number read cycles from three to one or by about 66%.

A raw media read is a reading of each byte in a memory device—for example, a read of each byte of the gaming program (data) in the high capacity storage memory 48. A raw media read is not performed using the CPU's standard operating system's file system read utilities. The raw media read is done at a lower level than an operating system's file read. The CPU reads each bit, byte, word, or other predetermined amount of data in a predetermined order from, for example, the first memory location to the last memory location of, for example, the high capacity storage memory 48. When a raw media read is performed, there is no determination of where each file starts and ends. The CPU at this time is reading bits or data without regard to file structure or oranization. The data bits must be read at this low level in order to verify and authenticate the raw media. At the same time, in parallel with or multiplexed with the raw media read, the CPU emulates what the operating system normally does when files are read.

As each bit, byte, word, etc. is read, the CPU, via emulation, determines what, if any, file the bits, bytes or words belong to. The hash for each file is then calculated so that each file can be properly authenticated.

As each file is extracted, mapped, and authenticated, each file is loaded into the main memory 30 by the boot-up software in the boot memory 46.

Figure 4:
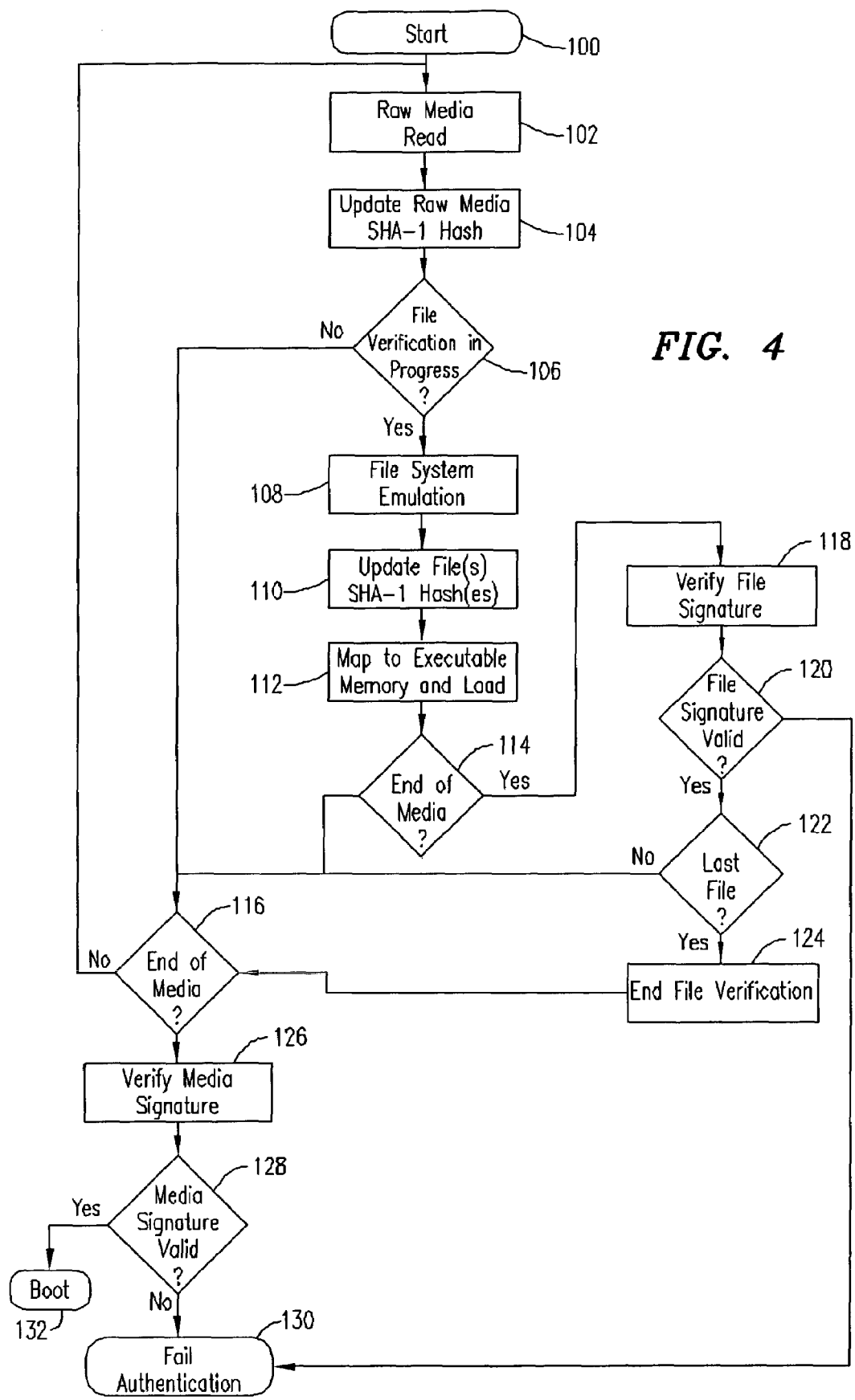
FIG. 4 is a flow chart for an exemplary authentication and boot process for a gaming machine.

An exemplary process for booting, performing a raw media read, performing a file read, performing an authentication of the gaming program, and loading the software files into an executable main memory is shown in FIG. 4. The exemplary processor requires a single read of the high capacity storage memory 48 or any other non-volatile memory device.

At step 100 the gaming device is either turned on or being reset. When a gaming device is booted or reset a software verification and authentication is required. At step 102 the microprocessor 32 reads a predetermined amount of data from the high capacity storage memory 48. In this exemplary embodiment the high capacity storage memory is a compact flash memory, but could be substantially any non-volatile type of memory device or devices. The microprocessor will probably read a byte of data from the high capacity storage memory 48 at a time, but may also read a word of data or more depending on what is appropriate for the architecture.

At step 104, after the byte is read, the byte is used as part of the SHA-1 hash calculation (or whatever type of hash or other calculation is being performed to authenticate the raw media). At step 106 the process checks to determine whether a file verification is in progress because the byte read may or may not be part of a file (as opposed to being part of a pointer or other non-file or related data found in the high capacity storage memory 48). If file verification is not in progress, then the process goes to step 116 and it is determined whether the byte was the last byte of the raw media. If it is not the last byte of the raw media, then the process returns to step 102.

Back at step 106, if a file verification is in process, meaning that if the byte is part of a file, then the yes path is taken. At step 108, the operating system's file system is emulated by the microprocessor 32, with the help of the boot memory 46, and it is determined what file the byte belongs to.

At step 110, the SHA-1 hash for the determined file is calculated or recalculated and updated using the additional file byte. In this manner, the hash calculations for the raw media and the files contained in the raw media are being performed substantially simultaneously, in parallel and/or in a time shared manner. The hash calculation for the raw media and the files contained within the raw media are being performed as a result of a single read of the raw media. Multiple reads of the raw media or data contained in the high capacity storage memory are not required in order to update and calculate respective hash calculations for both the total raw media and the files within the raw media.

At step 112, the byte is mapped to the main memory 36 (executable memory) and associated with its correct program file. Once mapped the bytes are copied to their mapped location in the main memory By mapping and copying the file bytes to executable memory here an additional read of the high capacity storage memory 48 is avoided. Since the file system was emulated in step 108, the microprocessor can determine and map where in executable memory the byte belongs in order for the byte to be associated with its appropriate software/firmware file. In other exemplary embodiments of the invention the bytes may be cached until after their associated file is verified and then copied to the main memory. This copying of the file(s) may be done at the end of the file signature valid step 120 or the end of file verification step 124 or possible other places in the exemplary flow diagram. Furthermore, the memory in which the bytes are being read from may also be an executable non-volatile memory. If the storage memory 48 is the executable memory, then the mapping and copying of the bytes may not be necessary.

At step 114, the process determines whether the byte is the last byte of the file. If it is not the last byte, then at step 116 the process determines whether the end of the raw media has been reached. If the end has not been reached then the process returns to step 102 and reads the next byte of data.

Back at step 114, if the process determines that the byte is the last byte of a file, then the hash calculation performed at step 110 should be the complete hash for the file. At step 118 the hash calculation result is used, along with a public key in a DSA, to verify the signature for the file. In an exemplary embodiment a digital signal algorithm (DSA) is used to verify the signature of the file. It is understood that it is possible to verify a file using various types of verification processes from a simple checksum calculation of all the bytes in the file to a hash calculation and on to a public key/private key DSA technique. At step 120, if the signature is not valid then the authentication process for the high capacity storage memory fails at step 130. On the other hand, if the file signature is determined to be valid then at step 122, the process determines if the file is the last file to be validated. If the file is not the last file to be validated, then the process determines if the last byte of media has been read at step 116 and returns to step 102 to read the next byte of raw media.

At step 122 the process determines whether or not the file is the last file that needs to have its signature verified. Then, at step 124 the file verification process is completed and if the software files have not been loaded in 112 or 120, then the files are loaded into the main memory 36. In effect any additional raw media reads will not be a byte that belongs to a file. Therefore, since all the files have been verified, the files can be loaded into main memory 36 and/or the battery backed memory 38.

With file verification completed, the process again checks if all the bytes of raw media have been verified. If there are additional bytes then the process goes back to perform another raw media byte read at step 102. If there are no more bytes of media to read, then the process has completed calculating the hash for the raw media (step 110) and is ready to perform the digital signature algorithm (DSA) in order to verify the media signature at step 126. At step 128 if the raw media signature is not valid then the authentication process fails at step 130 and the gaming machine's software does not boot up. On the other hand, if the raw media signature is valid, then both the files and the raw media are deemed valid. The validation and authentication process for booting or resetting the exemplary gaming machine is complete and the system can boot-up at step 132.

In yet another embodiment of the present gaming machine validation and authentication process, the files stored in the high capacity storage memory 48 are stored contiguously rather than using the more usual non-contiguous file storage technique that utilizes file pointers for files that are divided into portions throughout the memory media. By storing the files contiguously in the memory media 48, then each file can be copied to main memory 36 immediately after each file is verified. Furthermore, the file system emulation step may be simplified or eliminated based on the microprocessor being able to look up exactly where each file starts and ends without the need for a file emulation functionality. A look-up table may be all that is necessary. As such, each entire file could be checked for its hash and signature easily while the hash for the entire raw media is being calculated.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of authenticating contents of a memory device within a gaming machine during a boot-up operation or after a reset operation without executing contents during authentication, the gaming machine including an operation system, said method of authenticating comprising:
reading a predetermined amount of raw data from a memory device prior to creating a file system of said operating system;
calculating a data hash value using a first representation of all said predetermined amount of raw data;
emulating the file system prior to creating a file system, and determining to which file, of a plurality of files, said predetermined amount of raw data belongs;
calculating a file hash value, using a second representation of all said predetermined amount of raw data, for the file to which said predetermined amount of data belongs without an additional read of said predetermined amount of raw data;
determining whether said file to which said predetermined amount of data belongs is valid when said predetermined amount of raw data is used to complete the calculating of said file hash value for said file; and
determining whether all data in said memory device is valid after a last predetermined amount of raw data from said memory device is read, all of the raw data being read without an additional read of any of the raw data, and the calculating of said data hash value is completed.

2. The method of claim 1, wherein the method of claim 1 is repeated until said last predetermined amount of raw data is read from said memory device.

3. The method of claim 1, wherein the method of claim 1 is repeated until one of said plurality of files is determined to not be valid.

4. The method of claim 1, wherein said predetermined amount of raw data is a byte of data.

5. The method of claim 1, wherein said memory device is a flash memory.

6. The method of claim 1, wherein after calculating said data hash value said method further comprises determining whether said predetermined amount of raw data belongs to one of said plurality of files.

7. The method of claim 1, further comprising repeating the steps of reading the predetermined amount of data and calculating a data hash value until it is determined that said predetermined amount of data belongs to one of said plurality of files.

8. The method of claim 1, wherein said plurality of files are stored contiguously in said memory device.

9. The method of claim 1 further comprising loading said predetermined amount of raw data to a second memory device without an additional read of said predetermined amount of raw data.

10. In a gaming machine, a method of authenticating a media device including media data during a bootstrap operation or a reset operation without executing contents during authentication, said method comprising:
performing a raw media read of said media device, said raw media read comprising a read of at least one bit of data stored in said media device;
updating a media hash using said at least one bit of data, said media hash being associated with substantially all the data stored on said media device;
determining to which one file, of a plurality of files, that said at least one bit of data belongs;
updating a file hash using said at least one bit of data without an additional read of said at least one bit of data, said file hash being associated with said one file, of said plurality of files, that said at least one bit of data belongs;
using said a file hash to determine whether said one file, of said plurality of files, has a valid file signature after a last bit of said one file is used in said updating of a file hash step; and
using said a media hash to determine whether said media data has a valid media signature after a last bit of said media data is used in said updating of a media hash step, all of the media data being read without an additional read of any of the media raw data.

11. The method of claim 10, further comprising authenticating said media device and its contents based, at least in part, on said valid media signature and said valid file signature.

12. The method of claim 10, further comprising mapping and copying said at least one bit of data to executable memory after said step of updating said file hash.

13. The method of claim 10, further comprising loading said one file into executable memory after said step of using said file hash to determine whether said one file, of said plurality of files, has a valid signature.

14. The method of claim 10, wherein said media device is a non-volatile memory.

15. The method of claim 14, wherein said non-volatile memory is a flash memory.

16. The method of claim 10, where said plurality of files are stored contiguously in said media device.

17. A gaming machine comprising:
a user interface; and a central processing unit (CPU) coupled to said user interface, said CPU comprising:
a processor; a boot memory coupled to said processor;
a non-volatile memory coupled to said processor, said non-volatile memory storing data and a plurality of files; and
a plurality of instructions wherein at least a portion of said plurality of instructions are storable in said boot memory, and further wherein said plurality of instructions are configured to cause said processor to determine the authenticity of said data and said plurality of files stored in said non-volatile memory without executing contents during authentication, said plurality of instructions being configured to cause the processor to perform:
reading a predetermined amount of raw data from said non-volatile memory;
calculating a data hash value using a first representation of all of said predetermined amount of raw data from said non-volatile memory;
determining to which file, of said plurality of files, said predetermined amount of raw data belongs;
calculating a file hash value for the file, using a second representation all of said predetermined amount of raw data without an additional read of said predetermined amount of raw data;
determining whether the file, of said plurality of files, is a valid file after said predetermined amount of raw data is a last amount of data for the file, all of the raw data being read without an additional read of any of the raw data;

determining whether said data in said non-volatile memory is valid data after said predetermined amount of raw data is a last amount of data read from said non-volatile memory;

repeating said above plurality of instructions with only a single read until at least one of said plurality of files is determined to be invalid, the data in the non-volatile memory is determined to be invalid, or both the data in the non-volatile memory and all said plurality of files are determined to be valid.

18. The gaming machine of claim 17, wherein said plurality of instructions are further configured to identify said plurality of files and said data stored in said non-volatile memory as being authentic when all said plurality of files and the data in said non-volatile memory are valid.

19. The gaming machine of claim 17, wherein said plurality of instructions are performed by said processor at boot-up.

20. The gaming machine of claim 17, wherein said plurality of instructions are performed by said processor after said gaming machine performs a soft or hard reset.

21. The gaming machine of claim 17, wherein said plurality of files are stored contiguously in said non-volatile memory.

22. The gaming machine of claim 17, wherein said non-volatile memory is at least one of a high capacity storage memory and a serial read-write memory.

23. The gaming machine of claim 17, wherein said predetermined amount of raw data is a byte of data.

24. An article of manufacture for authenticating a media device's contents during boot-up or after reset of a gaming machine without executing contents during authentication, said article of manufacture comprising:
a first non-volatile memory device;
a plurality of instructions wherein at least a portion of said plurality of instructions are storable in said first non-volatile memory, and further wherein said plurality of instructions are configured to cause a processor to perform:
reading a predetermined amount of raw data from a second memory device;
calculating a data hash value using a first representation all of said predetermined amount of raw data from said second memory device;
determining to which file, of said plurality of files, said predetermined amount of raw data belongs;
calculating a file hash value for the file, using a second representation all of said predetermined amount of raw data of said predetermined amount of raw data;
determining whether the file, of said plurality of files, is a valid file after said predetermined amount of data is a last amount of raw data for the file;
determining whether said data in said second memory device is valid data after said predetermined amount of data is a last amount of raw data read from said second memory device, all of the raw data being read without an additional read of any of the raw data;
repeating said above plurality of instructions until at least one of said plurality of files is determined to be invalid, the data in the non-volatile memory is determined to be invalid, or both the data in the second memory device and all said plurality of files are determined to be valid.

25. The article of manufacture of claim 24, wherein said plurality of instructions are further configured to identify said plurality of files and said data stored in said second memory device as being authentic when all said plurality of files and the data in said second memory device are valid.

26. The article of manufacture gaming machine of claim 24, wherein said plurality of instructions are performed by said processor at boot-up.

27. The article of manufacture gaming machine of claim 24, wherein said plurality of instructions are performed by said processor after said gaming machine performs a soft or hard reset.

28. The article of manufacture gaming machine of claim 24, wherein said plurality of files are stored contiguously in said second memory device.

29. The article of manufacture gaming machine of claim 24, wherein said second memory device is at least one of a high capacity storage memory and a serial read-write memory.

30. The article of manufacture gaming machine of claim 24, wherein said predetermined amount of raw data is bit of data.

31. The article of manufacture gaming machine of claim 24, wherein said predetermined amount of raw data is a byte of data.

32. The article of manufacture gaming machine of claim 24, wherein said instructions cause said processor to further perform loading said plurality of files into a main memory after said plurality of files are validated without an additional read of said predetermined amount of data.

33. The article of manufacture gaming machine of claim 25, wherein said instructions cause said processor to further perform loading the file, of said plurality of files into a main memory after the file is validated without an additional read of said predetermined amount of data.

34. The article of manufacture gaming machine of claim 24, wherein said instructions cause said processor to further perform loading said plurality of files into a main memory after authenticating without an additional read of said predetermined amount of data.

35. A gaming machine comprising:
a processor;
a bus connected to said processor a boot memory connected to said bus; and
a non-volatile memory connected to said bus, said non-volatile memory comprising data bits and a plurality of files wherein at least a portion of said data bits make up said plurality of files;
said boot memory being adapted to provide said processor instructions for validating said data bits and said plurality of files using a data hash value calculated using a first representation of all of said data bits for said non-volatile memory and a file hash value calculated using a second representation of data bits without an additional read of said second representation of said data bits for each of said plurality of files after substantially a single raw read of each of said data bits without executing said plurality of files during validating, determining whether said file to which said data bits belongs is valid when said data bits completes the calculating of said file hash value for said file; and
determining whether all data in said memory device is valid after a last amount of said data bits from said memory device is read, all of the data bits being read without an additional read of any of the data bits, and the calculating of said data hash value is completed.

36. The gaming machine of claim 35, further comprising a main memory wherein after said single read of each of said data bits, said processor loads said data bits into said main memory.

37. The gaming machine of claim 35, further comprising a main memory wherein after each one of said plurality of files is validated said processor loads each one of said plurality of files into said main memory.

38. The gaming machine of claim 35, wherein after said processor validates said data bits and said plurality of files, said processor provides a signal indicating that the combination of said data bits and said plurality of files are authenticated.

39. The gaming machine of claim 35, wherein said boot memory provides said instructions to said processor during a boot-up operation or after a reset operation.

* * * * *

UNITED STATES PATENT AND TRADEMARK OFFICE
CERTIFICATE OF CORRECTION

PATENT NO.      : 7,600,108 B2
APPLICATION NO. : 10/463173
DATED           : October 6, 2009
INVENTOR(S)     : Thomas A. Gentles It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1202 days.

Signed and Sealed this

Fifth Day of October, 2010

David J. Kappos
*Director of the United States Patent and Trademark Office*